US012711497B2

(12) United States Patent
Srivastava et al.

(10) Patent No.: US 12,711,497 B2
(45) **Date of Patent: *Aug. 18, 2026**

(54) METHOD AND SYSTEM FOR CONTACTLESS TRANSACTIONS WITHOUT USER CREDENTIALS

(71) Applicant: Mastercard International Incorporated, Purchase, NY (US)

(72) Inventors: Abhinava Srivastava, Singapore (SG); Sapankumar K. Mandloi, Stamford, CT (US); Anthony Lopreiato, Scarsdale, NY (US)

(73) Assignee: Mastercard International Incorporated, Purchase, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 18/413,514

(22) Filed: Jan. 16, 2024

(65) Prior Publication Data

US 2024/0152916 A1 May 9, 2024

Related U.S. Application Data

(60) Continuation of application No. 17/451,699, filed on Oct. 21, 2021, now Pat. No. 11,915,233, which is a (Continued)

(51) Int. Cl.

| | |
|---|---|
| ***G06Q 20/38*** | (2012.01) |
| ***G06Q 20/20*** | (2012.01) |

(Continued)

(52) U.S. Cl.

CPC ....... *G06Q 20/3829* (2013.01); *G06Q 20/204* (2013.01); *G06Q 20/3821* (2013.01); (Continued)

(58) Field of Classification Search

CPC ............. G06Q 20/3829; G06Q 20/204; G06Q 20/3821; G06Q 20/385; G06Q 20/4014; (Continued)

(56) References Cited

U.S. PATENT DOCUMENTS

| | | | |
|---|---|---|---|
| 6,728,379 B1 | 4/2004 | Ishibashi et al. | |
| 6,931,545 B1 * | 8/2005 | Ta | H04L 63/0823 726/10 |

(Continued)

FOREIGN PATENT DOCUMENTS

| | | |
|---|---|---|
| WO | 2015084755 A1 | 6/2015 |
| WO | 2016033610 A1 | 3/2016 |

OTHER PUBLICATIONS

Pascal Urien, et al., A Breakthrough for Prepaid Payment: End to End Token Exchange and Management Using Secure SSL Channels Created by EAP-TLS Smart Cards, Jul. 11, 2011, IEEE, pp. 476-483 (Year: 2011).*

(Continued)

*Primary Examiner* — Nilesh B Khatri

(74) *Attorney, Agent, or Firm* — Panitch Schwarze Belisario & Nadel LLP

(57) ABSTRACT

A method for generation of an application cryptogram for use in a payment transaction includes: storing, in a first memory, a single use key associated with a transaction account; electronically transmitting the single use key to a processing server; receiving an encrypted session key and a server encryption key from the processing server; executing a first query to store the encrypted session key in the first memory and a second query to store the server encryption key in a second memory; decrypting the encrypted session key using the server encryption key; generating an application cryptogram based on the decrypted session key; and (Continued)

electronically transmitting the generated application cryptogram for use in a payment transaction.

10 Claims, 9 Drawing Sheets

Related U.S. Application Data division of application No. 15/493,759, filed on Apr. 21, 2017, now Pat. No. 11,182,779.

(60) Provisional application No. 62/325,722, filed on Apr. 21, 2016.

(51) Int. Cl.

*G06Q 20/40* (2012.01)
*H04L 9/08* (2006.01)
*H04L 9/14* (2006.01)
*H04L 9/40* (2022.01)
*H04W 12/033* (2021.01)
*H04W 12/10* (2021.01)
*G06Q 20/32* (2012.01)
*H04W 12/04* (2021.01)

(52) U.S. Cl.

CPC ....... *G06Q 20/385* (2013.01); *G06Q 20/4014* (2013.01); *H04L 9/0819* (2013.01); *H04L 9/0861* (2013.01); *H04L 9/14* (2013.01); *H04L 63/0428* (2013.01); *H04L 63/067* (2013.01); *H04L 63/08* (2013.01); *H04W 12/033* (2021.01); *H04W 12/10* (2013.01); *G06Q 20/321* (2020.05); *G06Q 2220/00* (2013.01); *H04L 63/126* (2013.01); *H04L 2209/56* (2013.01); *H04L 2463/062* (2013.01); *H04W 12/04* (2013.01)

(58) Field of Classification Search

CPC .............. G06Q 20/321; G06Q 2220/00; H04L 9/0819; H04L 9/0861; H04L 9/14; H04L 63/0428; H04L 63/067; H04L 63/08; H04L 63/126; H04L 2209/56; H04L 2463/062; H04W 12/033; H04W 12/10; H04W 12/04

See application file for complete search history.

(56) References Cited

U.S. PATENT DOCUMENTS

2002/0111919 A1* 8/2002 Weller .................. G06Q 20/12 705/67
2003/0161473 A1* 8/2003 Fransdonk ............ H04L 63/045 380/277
2005/0182933 A1* 8/2005 Ritz ...................... G06F 40/221 713/168
2005/0188286 A1 8/2005 Liu et al.
2008/0034216 A1* 2/2008 Law ..................... H04L 9/3273 713/168
2009/0106551 A1* 4/2009 Boren ..................... H04L 9/321 380/259
2011/0246369 A1* 10/2011 de Oliveira ............ G06Q 20/40 705/64
2012/0074219 A1 3/2012 Burdett
2012/0163598 A1* 6/2012 Wang .................... H04L 63/061 380/259
2012/0289188 A1 11/2012 Marcus et al.
2013/0227286 A1* 8/2013 Brisson ................ H04L 63/062 713/168
2013/0262317 A1 10/2013 Collinge et al.
2015/0019442 A1* 1/2015 Hird .................... H04W 12/041 726/30
2015/0019443 A1* 1/2015 Sheets ................ G06Q 20/3829 705/71
2015/0032627 A1* 1/2015 Dill ........................ G06Q 20/40 705/44
2015/0052061 A1* 2/2015 Anderson ............ G06Q 20/409 705/44
2015/0088674 A1* 3/2015 Flurscheim .......... G06Q 20/326 705/17
2015/0154595 A1 6/2015 Collinge et al.
2015/0154596 A1 6/2015 Collinge et al.
2015/0156176 A1 6/2015 Collinge et al.
2015/0178724 A1 6/2015 Ngo et al.
2015/0269566 A1 9/2015 Gaddam et al.
2015/0287030 A1 10/2015 Sagady et al.
2016/0092872 A1* 3/2016 Prakash ............... G06Q 20/322 705/65
2016/0277363 A1 9/2016 Kaladgi et al.
2017/0103382 A1* 4/2017 Kim ................... G06Q 20/3278
2018/0114000 A1* 4/2018 Taylor ................... H04L 9/0643
2018/0341937 A1* 11/2018 Kim ................... G06Q 20/3829
2019/0005493 A1 1/2019 Francesco

OTHER PUBLICATIONS

Kozyrakis, "Using the SafetyNet API", Oct. 9, 2015, Synopsis Software Integrity Blog, 11 pages.

International Search Report and Written Opinion issued by the International Search Authority on Jul. 18, 2017 in corresponding PCT Application No. PCT/US2017/028570 (13 pages).

G. E. Suh, et al., Efficient Memory Integrity Verification and Encryption for Secure Processors, Jan. 8, 2004, IEEE, pp. 1-12 ( Year: 2004).

* cited by examiner

METHOD AND SYSTEM FOR CONTACTLESS TRANSACTIONS WITHOUT USER CREDENTIALS

FIELD

The present disclosure relates to the generation of application cryptograms for use in contactless payment transactions without user credentials, specifically the server-side generation of a session key without the use of user-provided authentication for provisioning to a computing device for generation of an application cryptogram for the conveyance of payment credentials in an electronic payment transaction.

BACKGROUND

As the use of mobile devices and other types of computing devices has become more prevalent, banks and other financial institutions have sought methods for the provisioning of payment credentials to computing devices for use thereby. Some methods have been developed that use single use keys in combination with user authentication data, most commonly a personal identification number (PIN), as part of the process for conveying payment credentials to a point of sale from a computing device. Such methods are described in more detail in U.S. patent application Ser. No. 14/558,189, filed Dec. 2, 2014; U.S. patent application Ser. No. 14/558,049, filed Dec. 2, 2014; U.S. patent application Ser. No. 14/557,974, filed Dec. 2, 2014; and U.S. patent application Ser. No. 13/827,042, filed Mar. 14, 2013, each of which are herein incorporated by reference in their entirety.

However, there may be instances when performing user authentication as part of the process for conveying payment credentials from a computing device is undesirable. For example, for low value transactions, user convenience may outweigh the risk of fraud that is mitigated via the use of user authentication. In another example, another entity involved in the payment transaction, such as an issuing financial institution, may want to perform user authentication separately, such as directly on the computing device without affecting conveyed payment credentials, or use a different type of user authentication for which the system is not configured.

Thus, there is a need for a technological improvement to existing payment systems that provides a technical solution for the generation of secure application cryptograms and other payment credential data on a computing device for use in the conveyance of payment credentials therefrom in a payment transaction, without the use of user authentication. Such a solution may provide for transactions conducted via a computing device with less inconvenience for the user and with the ability for alternative user verification and authentication methods to be implemented.

SUMMARY

The present disclosure provides a description of systems and methods for the generation of application cryptograms on a computing device for use in a payment transaction and the provisioning of session keys thereto for the generation of the application cryptograms.

A method for generation of an application cryptogram for use in a payment transaction includes: storing, in a first memory of a computing device, a single use key associated with a transaction account; electronically transmitting, by a transmitting device of the computing device, the single use key to a processing server; receiving, by a receiving device of the computing device, an encrypted session key and a server encryption key; executing, by a querying module of the computing device, a first query to store the encrypted session key in the first memory and a second query to store the server encryption key in a second memory of the computing device; decrypting, by an encryption module of the computing device, the encrypted session key using the server encryption key; generating, by a generation module of the computing device, an application cryptogram based on the decrypted session key; and electronically transmitting, by the transmitting device of the computing device, the generated application cryptogram for use in a payment transaction.

A method for provisioning of a session key for use in generating an application cryptogram for use in a payment transaction includes: storing, in an account database of a processing server, an account profile, wherein the account profile includes at least an account identifier and an account identification number; receiving, by a receiving device of the processing server, a single use key and the account identifier from a computing device; generating, by a generation module of the processing server, a session key based on at least the received single use key and the account identification number included in the account profile; encrypting, by an encryption module of the processing server, the generated session key using a server encryption key; and electronically transmitting, by a transmitting device of the processing server, at least the encrypted session key and the server encryption key to the computing device.

A system for generation of an application cryptogram for use in a payment transaction includes: a first memory of a computing device configured to store a single use key associated with a transaction account; a transmitting device of the computing device configured to electronically transmit the single use key to a processing server; a receiving device of the computing device configured to receive an encrypted session key and a server encryption key; a querying module of the computing device configured to execute a first query to store the encrypted session key in the first memory and a second query to store the server encryption key in a second memory of the computing device; an encryption module of the computing device configured to decrypt the encrypted session key using the server encryption key; and a generation module of the computing device configured to generate an application cryptogram based on the decrypted session key. The transmitting device of the computing device is further configured to electronically transmit the generated application cryptogram for use in a payment transaction.

A system for provisioning of a session key for use in generating an application cryptogram for use in a payment transaction includes: an account database of a processing server configured to store an account profile, wherein the account profile includes at least an account identifier and an account identification number; a receiving device of the processing server configured to receive a single use key and the account identifier from a computing device; a generation module of the processing server configured to generate a session key based on at least the received single use key and the account identification number included in the account profile; an encryption module of the processing server configured to encrypt the generated session key using a server encryption key; and a transmitting device of the processing server configured to electronically transmit at least the encrypted session key and the server encryption key to the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
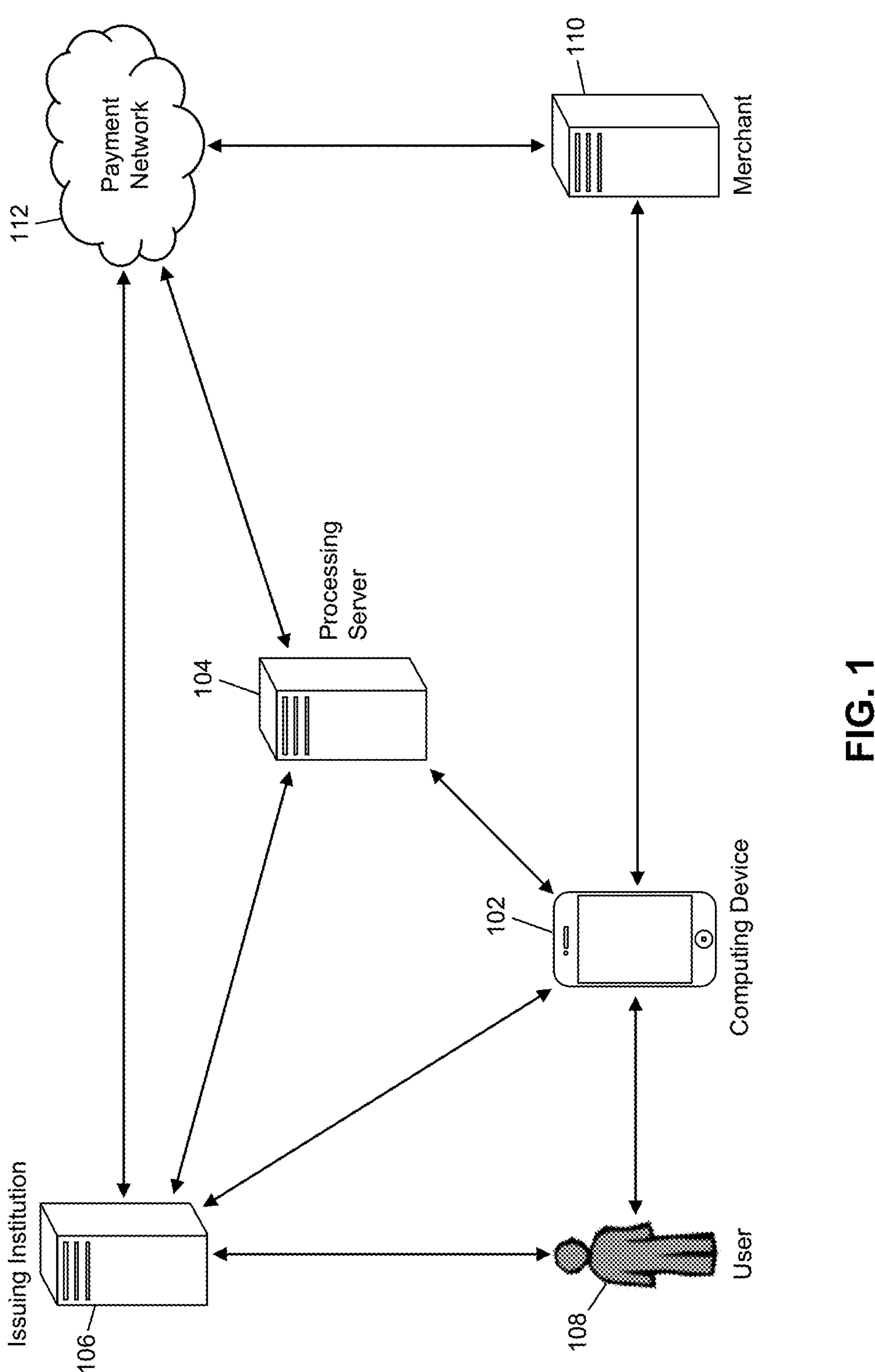
FIG. 1 is a block diagram illustrating a high level system architecture for the provisioning of session keys to a computing device and use thereof in the generation of application cryptograms for use in electronic payment transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for Generation of Application Cryptograms on a Computing Device

FIG. 1 illustrates a system 100 for the provisioning of session keys to a computing device for use in the generation of application cryptograms thereby for use in a payment transaction, where the session keys and subsequent application cryptograms may be generated without the use of user authentication, providing for additional convenience to users and the ability for alternative user verification methods.

The system 100 may include a computing device 102. The computing device 102, discussed in more detail below, may be configured to generate application cryptograms for conveyance, along with additional data comprising payment credentials, for use in a payment transaction. The computing device 102 may be any type of computing device suitable for performing the functions discussed herein, such as a cellular phone, smart phone, smart watch, wearable computing device, implantable computing device, desktop computer, laptop computer, notebook computer, tablet computer, smart television, etc. The system 100 may also include a processing server 104. The processing server 104, discussed in more detail below, may be configured to generate session keys for provisioning to computing devices 102, for use in the generation of the application cryptograms conveyed from the computing device 102 for use in payment transactions.

In the system 100, an issuing institution 106 may issue a transaction account to a user 108. The issuing institution 106 may be a financial institution, such as an issuing bank, or other entity configured to issue transaction accounts to users 108 for use in funding payment transactions. The issuing institution 106 may issue a transaction account to the user 108, which the user 108 may be able to use to fund future payment transactions conducted thereby. As part of the use of the transaction account, the user 108 may register the computing device 102 with the processing server 104 for use in the conveyance of payment credentials associated with the transaction account.

The processing server 104 may be configured to provision a primary account number and other data that comprises or is used in the generation of data that comprises payment credentials for the transaction account to the computing device 102. Methods for the secure provisioning of data to a computing device 102 will be apparent to persons having skill in the relevant art. The computing device 102 may be configured to receive the data, store the data in one or more memories in the computing device 102, and use the data in the generation and conveyance of payment credentials for use in a payment transaction. Other data that may be provisioned that may comprise or be used in the generation of data that comprises payment credentials may include, for example, a security code, expiration date, cardholder name, authorized user name, tracking data, card layout description data, digit counts, bitmaps, etc.

In order to increase account security and decrease danger to the transaction account if the computing device is compromised, single use keys may be provisioned to the computing device 102 by the processing server 104. A single use key may be a payment token that is valid for a single payment transaction that may be used in the generation of an application cryptogram for inclusion in payment credentials conveyed for the payment transaction. Single use keys may be such that, after being used once in the generation of an application cryptogram, any application cryptograms generated subsequently will result in the denial of the related payment transaction as being unauthorized. In some embodiments, the computing device 102 may be configured to delete a single use key from memory of the computing device 102 after usage. A single use key may include data suitable for use in the generation of an application cryptogram, such as a distinct application transaction counter, an encryption key, or other suitable data.

The processing server 104 may provision a single use key to the computing device 102 using suitable communication networks and methods for the secure transmission of data. In some instances, single use keys may be encrypted prior to transmission, and may be decrypted by the computing device 102 on receipt using a suitable encryption key, such as may be provisioned to the computing device 102 during registration of the transaction account. The computing device 102 may store the single use key therein until a payment transaction is initiated.

When the user 108 wants to use the transaction account for a payment transaction, the user 108 may input an instruction into the computing device 102 using a suitable input device. The computing device 102 may, upon receipt of the instruction, initiate the generation of an application cryptogram and other data that comprises the payment credentials to be conveyed for funding of the payment transaction via the associated transaction account. To generate the application cryptogram, the computing device 102 may first electronically transmit the single use key to the processing server 104 using a system communication network and method. The communication network may be, for example, a local area network, a wireless area network, a cellular communication network, a radio frequency network, the Internet, etc.

The processing server 104 may receive the single use key from the computing device 102. The processing server 104 may then use the single use key in the generation of a session key. In some instances, the single use key may be combined with an account identification number (AIN) for generation of the session key. The AIN may be a number similar or equivalent to a personal identification number (PIN) that is associated with the transaction account. In such instances, the AIN may be used in place of a PIN such that the session key may be generated using existing processes, but without requiring the user 108 to supply the PIN as part of the generation of the session key. As a result, the methods discussed herein may be implemented with minimal reconfiguration of legacy processing systems. In such instances, the processing server 104 may store the AIN with other data in an account profile, discussed in more detail below, that is associated with the transaction account.

The processing server 104 may generate the session key using the single use key and AIN, and then encrypt the session key with a server encryption key. The session key may be encrypted using one or more encryption algorithms suitable for the encryption thereof. The processing server 104 may then provision the encrypted session key and the server encryption key used in the encryption to the computing device 102 using suitable communication networks and methods. The computing device 102 may receive the encrypted session key and the server encryption key and may store them in the computing device 102. In some embodiments, the encrypted session key and server encryption key may be stored in separate memories of the computing device 102. For example, the server encryption key may be stored in random access memory (RAM), while the encrypted session key may be stored in a hard disk or solid state drive in the computing device 102 or in a Secure Element or other secured storage. In some embodiments, the server encryption key, or the memory of the computing device 102 in which it is stored, may be configured to delete or otherwise render inoperable the server encryption key after a predetermined period of time or if any potential compromise of the server encryption key is detected.

As part of the conveyance of payment credentials for the payment transaction, the computing device 102 may decrypt the encrypted session key using the server encryption key. The computing device 102 may then generate an application cryptogram using the decrypted session key, using traditional methods and systems configured therefor. In some embodiments, the provisioning of the encrypted session key and server encryption key to the computing device 102 may occur prior to the receipt of an instruction indicating initiation of a payment transaction. For instance, the encrypted session key and server encryption key may be provisioned to the computing device 102 following the provisioning of the corresponding single use key, and may be stored until such time that the user 108 instructs the computing device 102 for generation of the application cryptogram. Alternatively, the computing device 102 may store the single use key and may transmit it to the processing server 104 for provisioning of the encrypted session key and server encryption key upon receipt of an instruction to initiate the payment transaction.

After the application cryptogram has been generated by the computing device 102 using the decrypted session key, the computing device 102 may convey the application cryptogram, along with any other payment credentials, to a merchant 110 for use in the payment transaction. The payment credentials may be conveyed to the merchant 110 via a computing system of the merchant 110 (e.g., a point of sale system) using any suitable method, such as electronic transmission via near field communication, the display of a machine-readable code encoded with the payment credentials and read by the merchant 110 computing system, etc. In some embodiments, the computing device 102 may be configured to delete the session key and server encryption key after use. In other embodiments, the computing device 102 may be configured to retain the encrypted session key, but delete the decrypted session key, until instructed by the processing server 104, such as following validation of the application cryptogram, as discussed below.

The merchant 110 may receive the payment credentials and may electronically transmit the payment credentials and other data related to the payment transaction to a payment network 112 for processing. Other data related to the payment transaction, collectively referred to herein as "transaction data," may include, for example, a transaction amount, transaction time, transaction date, geographic location, merchant name, merchant category code, merchant identification number, issuer data, acquirer data, product data, offer data, reward data, loyalty data, etc. In some embodiments, the merchant 110 may electronically transmit the transaction data, including the payment credentials with the application cryptogram generated using the decrypted session key, directly to the payment network 112. In other embodiments, the transaction data may be electronically transmitted to the payment network 112 via one or more intermediate entities, such as an acquiring financial institution and gateway processor.

In an exemplary embodiment, the transaction data may be formatted in a transaction message that is electronically transmitted to the payment network 112 via payment rails associated therewith. The transaction message may be formatted by the merchant 110 or by an intermediate entity through which the transaction message is transmitted, such as an acquiring financial institution. Transaction messages may be specially formatted data messages that are formatted pursuant to one or more standards governing the exchange of financial transaction messages, such as the International Organization of Standardization's ISO 8583 or ISO 20022 standards. Transaction messages may include a message type indicator indicative of a type of the transaction message, a plurality of data elements configured to store transaction data and other data used in the processing of the related payment transaction, and one or more bitmaps, which may be configured to indicate the data elements included in the transaction message and the data stored therein.

The transaction message for the payment transaction, which may include a message type indicator indicating an authorization request, may be electronically transmitted to the payment network 112 via the payment rails associated therewith. The payment network 112 may perform any traditional functions associated therewith involved in the processing of payment transactions, such as account number mapping, the application of transaction controls, etc., and may forward the transaction message to the processing server 104. In some embodiments, the processing server 104 may be a part of the payment network 112. In such embodiments, the processing server 104 may receive the transaction message via internal communication methods of the payment network 112, or may receive the transaction message from an external entity, such as the merchant 110 or an acquiring financial institution, as part of the processing of the payment transaction.

The processing server 104 may be configured to verify or otherwise validate the application cryptogram included in the payment credentials that are stored in the transaction message. Validation of the application cryptogram may be performed by the processing server 104 generating a second application cryptogram using the session key previously generated by the processing server 104, and comparing the second application cryptogram to the cryptogram included in the transaction message. If the cryptograms match, the processing server 104 may validate the payment credentials, as it may indicate that the computing device 102 used the proper session key provisioned thereto in the generation of the application cryptogram used in the payment transaction. If the cryptograms do not match, the processing server 104 may include such data in the transaction message for use by the issuing institution 106 in the approval or denial of the payment transaction. In some embodiments, the processing server 104 may be authorized (e.g., by the issuing institution 106) to deny the payment transaction upon unsuccessful validation of the application cryptogram.

Upon validation of the application cryptogram, if the processing server 104 does not deny the payment transaction, then the transaction message may be forwarded to the issuing institution 106 either directly from the processing server 104 or via the payment network 112. In some embodiments, the processing server 104 may be a part of the issuing institution 106. In such an embodiment, the transaction message and validation result may be electronically transmitted to the issuing institution 106 via internal communication methods. The issuing institution 106 may approve or deny the payment transaction and return a transaction message comprising an authorization response back to the payment network 112 that indicates the approval or denial.

The payment network 112 may perform any additional processing and may return the authorization response to the merchant 110, either directly or via the one or more intermediate entities used in the transmission of the transaction data to the payment network 112. The merchant 110 may then finalize the payment transaction with the user 108.

Following the processing of the payment transaction, the computing device 102 may be configured to electronically transmit a request to the processing server 104 for a new single use key. In some instances, the computing device 102 may prompt the processing server 104 for the encrypted session key and server encryption key directly. In some cases, the computing device 102 may be configured to store a plurality of single use keys. In such cases, after the payment transaction is processed, if the computing device 102 still has single use keys remaining, the computing device 102 may electronically transmit a new single use key to the processing server 104 for use in the generation and provisioning of the corresponding encrypted session key. In such a case, the new single use key may be selected based on criteria previously established by the processing server 104, such as during registration. For example, the single use keys may have an ordering for their usage.

In some embodiments, the processing server 104 may be configured to validate the integrity of the computing device 102 prior to the provisioning of encrypted session keys and the server encryption key thereto. In such an embodiment, the computing device 102 may be configured to perform one or more integrity checks using traditional methods and systems for the evaluation of the integrity of a computing device 102. For example, the computing device 102 may be a computing device that includes the Android operation system, where the integrity check may include use of Google SafetyNet. In some cases, evaluation of the integrity of the computing device 102 may specifically include evaluation of the integrity of the memories used to store the single use keys, encrypted session keys, and server encryption keys. In such embodiments, the computing device 102 may electronically transmit a result of the device integrity check or checks to the processing server 104 along with the single use key. The processing server 104 may then make a determination to provision the corresponding encrypted session key and server encryption key to the computing device 102 based on the result of the device integrity check. For instance, if the device integrity is not suitable (e.g., there is an indication of compromise of the memories used to store the encrypted session key or server encryption key, or of the computing device 102 generally), the processing server 104 may decline to provision the keys to the computing device 102 to protect the transaction account.

The methods and systems discussed herein may provide for the use of a computing device 102 in conveying payment credentials for a payment transaction, without requiring the user 108 to submit a PIN or other form of user authentication for use in the generation of an application cryptogram used to validate the payment credentials. As a result, the payment credentials may be conveyed with higher convenience to the user 108. In instances where the processing server 104 may use an alternative to the user PIN, such as an AIN or similar value, the methods and systems discussed herein may also be implemented with minimal reconfiguration of legacy payment systems, resulting in a more efficient implementation of the disclosed technological solution.

Furthermore, user authentication may still be implemented directly on the computing device 102, such as may be administered by the issuing institution 106, where the user 108 may be authenticated, but where such user authentication data may not be used directly in the generation of the application cryptogram. For example, the user 108 may be required to first be authenticated before the computing device 102 electronically transmits the single use key to the processing server 104, or before the computing device 102 generates the application cryptogram for conveyance to the merchant 110. In some instances, the issuing institution 106, processing server 104, or other entity (e.g., the user 108) may place limits on the ability for transacting with the computing device 102 without user authentication. For example, the issuing institution 106 may implement user authentication, but may only require such authentication if the transaction amount for the payment transaction exceeds a specific value. In another example, the computing device 102 may be configured to generate the session key directly using a PIN provided by the user 108, which may be required for payment transactions of a specific transaction amount or other criteria, or may request the encrypted session key from the processing server 104 for other payment transactions. For instance, the user 108 may enter their PIN for generation of the session key on the computing device 102 for transactions above $100, but may not be required to enter their PIN (e.g., and thus have the processing server 104 provision the encrypted session key) for transactions below $100.

Computing Device

Figure 2:
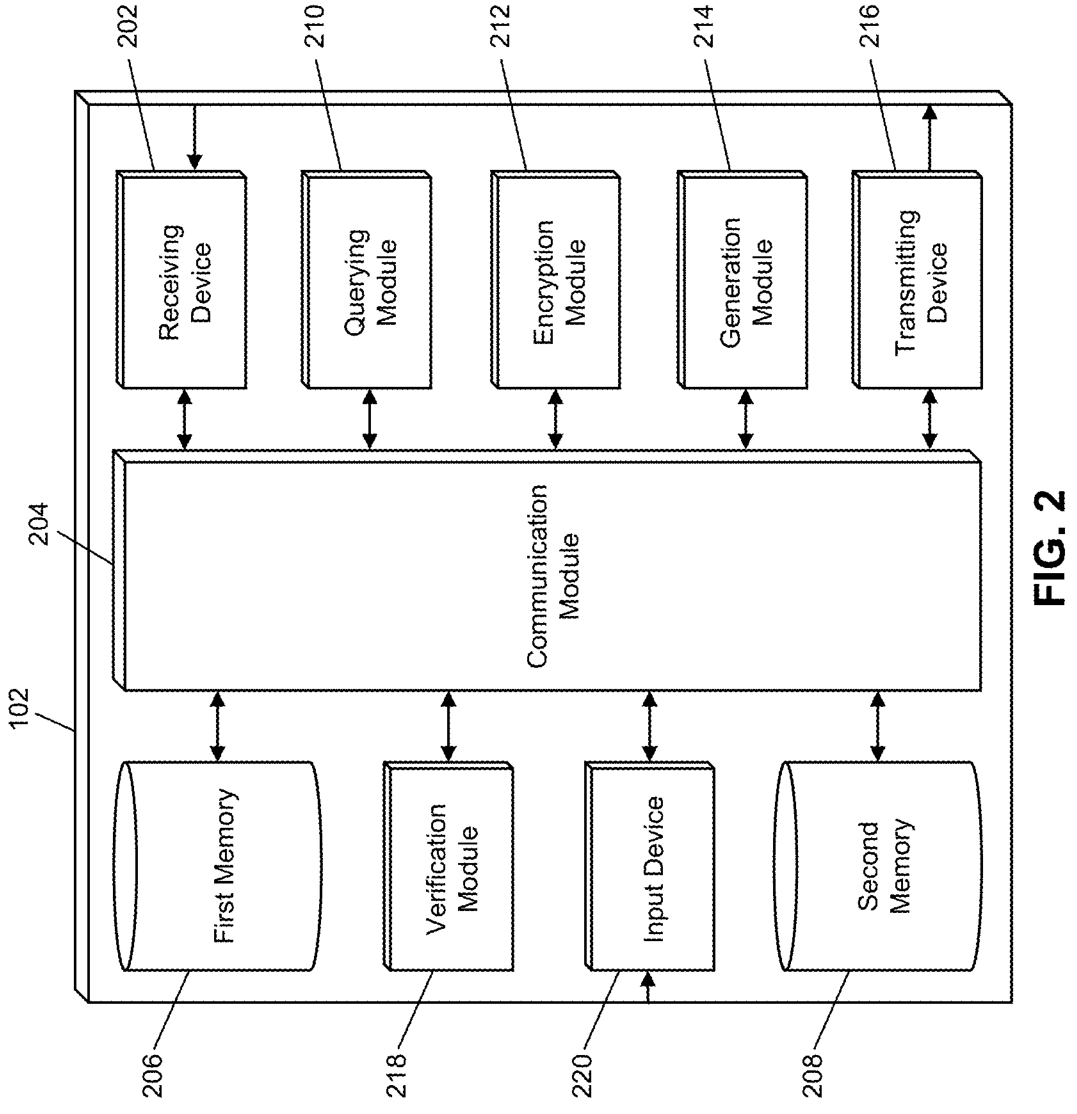
FIG. 2 is a block diagram illustrating the computing device of FIG. 1 for the generation of application cryptograms using provisioned session keys in accordance with exemplary embodiments.

FIG. 2 illustrates an embodiment of a computing device 102 of the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 900 illustrated in FIG. 9 and discussed in more detail below may be a suitable configuration of the computing device 102.

The computing device 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from the processing server 104, issuing institutions 106, merchants 110, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the processing server 104, which may be superimposed or otherwise encoded with single use keys, encrypted session keys, server encryption keys, and other data comprising or used in the generation of payment credentials. The receiving device 202 may also be configured to receive data signals electronically transmitted by the processing server 104 for use in the management of the computing device 102 and transaction account, such as may be superimposed or otherwise encoded with data that may be used in registration, account alerts, requests for user data, etc. The receiving device 202 may also be configured to receive data signals electronically transmitted by issuing institutions 106, such as may be superimposed or otherwise encoded with transaction account data, and by merchants 110, such as may be superimposed or otherwise encoded with transaction data, which may be used in the generation and conveyance of payment credentials, such as to determine if a user PIN is required or used in the generation of an application cryptogram based on the transaction data.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 210, encryption module 212, generation module 214, verification module 218, etc. As used herein, the term “module” may be software or hardware particularly programmed to receive an input, perform one or more processes using the input, and provide an output. The input, output, and processes performed by various modules will be apparent to one skilled in the art based upon the present disclosure.

The computing device 102 may include a first memory 206 and a second memory 208. Each memory 206 and 208 may be configured to store data used in performing the functions discussed herein using a suitable data storage format and schema. In some instances, each memory 206 and 208 may be a relational database that utilizes structured query language for the storage, identification, modifying, updating, accessing, etc. of structured data sets stored therein. In some instances, the first memory 206 and second memory 208 may be different types of memory. For example, the first memory 206 may be a hard disk drive, and the second memory 208 may be random access memory. The first memory 206 may be configured to store single use keys, encrypted session keys, and other data that comprises or is used in the generation of payment credentials. The second memory 208 may be configured to store server encryption keys. In some instances, the second memory 208 may be configured to delete or otherwise render inoperable server encryption keys stored therein based on predetermined criteria, such as usage of the server encryption key, expiration of a predetermined period of time, detection or an attempt of unauthorized access to the second memory 208 or tampering of the computing device 102, etc. In some cases, the first memory 206 and/or second memory 208 may be a Secure Element or other type of secure data storage. The first memory 206 and/or second memory 208 may also include encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art.

The computing device 102 may include a querying module 210. The querying module 210 may be configured to execute queries on databases to identify information. The querying module 210 may receive one or more data values or query strings, and may execute a query string based thereon on an indicated database, such as the first memory 206, to identify information stored therein. The querying module 210 may then output the identified information to an appropriate engine or module of the computing device 102 as necessary. The querying module 210 may, for example, execute a query on the first memory 206 to identify a single use key for electronic transmission to the processing server 104, and may execute queries on the first memory 206 and second memory 208 for the storage of encrypted session keys and server encryption keys therein, respectively.

The computing device 102 may also include an encryption module 212. The encryption module 212 may be configured to encrypt and decrypt data via the use of encryption keys and associated algorithms. The encryption module 212 may receive data for encryption or decryption, may perform the appropriate task, and may output the subsequently encrypted or decrypted data to another module or engine of the computing device 102. In some instances, the encryption keys and/or algorithms to be used by the encryption module 212 may be provided with the data. In other instances, the encryption module 212 may identify (e.g., via queries executed by the querying module 210 on the appropriate memory) the encryption keys and/or algorithms for use. The encryption module 212 may, for example, be configured to decrypt encrypted session keys using server encryption keys provisioned from the processing server 104.

The computing device 102 may also include a generation module 214. The generation module 214 may be configured to generate data for use in performing the functions of the computing device 102 as discussed herein. The generation module 214 may receive an instruction for data to be generated, may generate the requested data, and may output the data to another module or engine of the computing device 102. In some instances, the generation module 214 may also receive data for use in the generation of the requested data, or may identify (e.g., via queries executed by the querying module 210 on the appropriate memory) data for use therein. The generation module 214 may be configured to generate application cryptograms and other data comprising payment credentials for conveyance to a merchant 110 as part of a payment transaction. The generation module 214 may also be configured to generate data messages for electronic transmission to the processing server 104, such as may include single use keys and data requests used in performing the functions discussed herein.

The computing device 102 may also include a transmitting device 216. The transmitting device 216 may be configured to transmit data over one or more networks via one or more network protocols. In some embodiments, the transmitting device 216 may be configured to transmit data over the payment rails, such as using specially configured infrastructure associated with payment networks 112 for the transmission of transaction messages that include sensitive financial data and information, such as identified payment credentials. In some instances, the transmitting device 216 may be configured to transmit data to the processing server 104, issuing institutions 106, merchants 110, payment networks 112, and other entities via alternative networks, such as the Internet. In some embodiments, the transmitting device 216 may be comprised of multiple devices, such as different transmitting devices for transmitting data over different networks, such as a first transmitting device for transmitting data over the payment rails and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to the processing server 104 that may be superimposed or otherwise encoded with single use keys and other data that may be used in performing the functions discussed herein, such as authentication data for registration of a transaction account, data requests for single use keys, etc. The transmitting device 216 may also be configured to electronically transmit data signals to merchants 110 that may be superimposed or otherwise encoded with payment credentials, which may include application cryptograms generated by the generation module 214 using decrypted session keys received (e.g., via the receiving device 202) from the processing server 104. In some embodiments, the transmitting device 216 may be configured to electronically transmit data signals to issuing institutions 106, such as may be superimposed or otherwise encoded with data for registration or use of the transaction account.

In some embodiments, the computing device 102 may also include a verification module 218. The verification module 218 may be configured to receive data as input, may verify the data, and may output a result of the verification to another module or engine of the computing device 102. For example, the verification module 218 may be configured to verify integrity of the computing device 102 and/or of specific modules, engines, or memories included therein. For instance, the verification module 218 may be requested to verify the integrity of the first memory 206 and the second memory 208 prior to the receipt of encrypted session keys and server encryption keys. Methods for verifying the integrity of a computing device 102 will be apparent to persons having skill in the relevant art.

The computing device 102 may also include one or more input devices 220. Input devices 220 may be devices configured to receive input from a user 108 of the computing device 102, and may route the received input to another module or engine of the computing device 102, such as via the communication module 204. Input devices 220 may be any type of device suitably configured to receive input from a user 108, such as a keyboard, mouse, touch screen, click wheel, scroll wheel, microphone, camera, etc. An input device 220 of the computing device 102 may be configured to receive an instruction from the user 108 to initiate the provisioning of an encrypted session key to the computing device 102, the requesting of additional single use keys from the processing server 104, the generation of an application cryptogram for a payment transaction, the conveyance of payment credentials to a merchant 110 for a payment transaction, etc.

Processing Server

Figure 3:
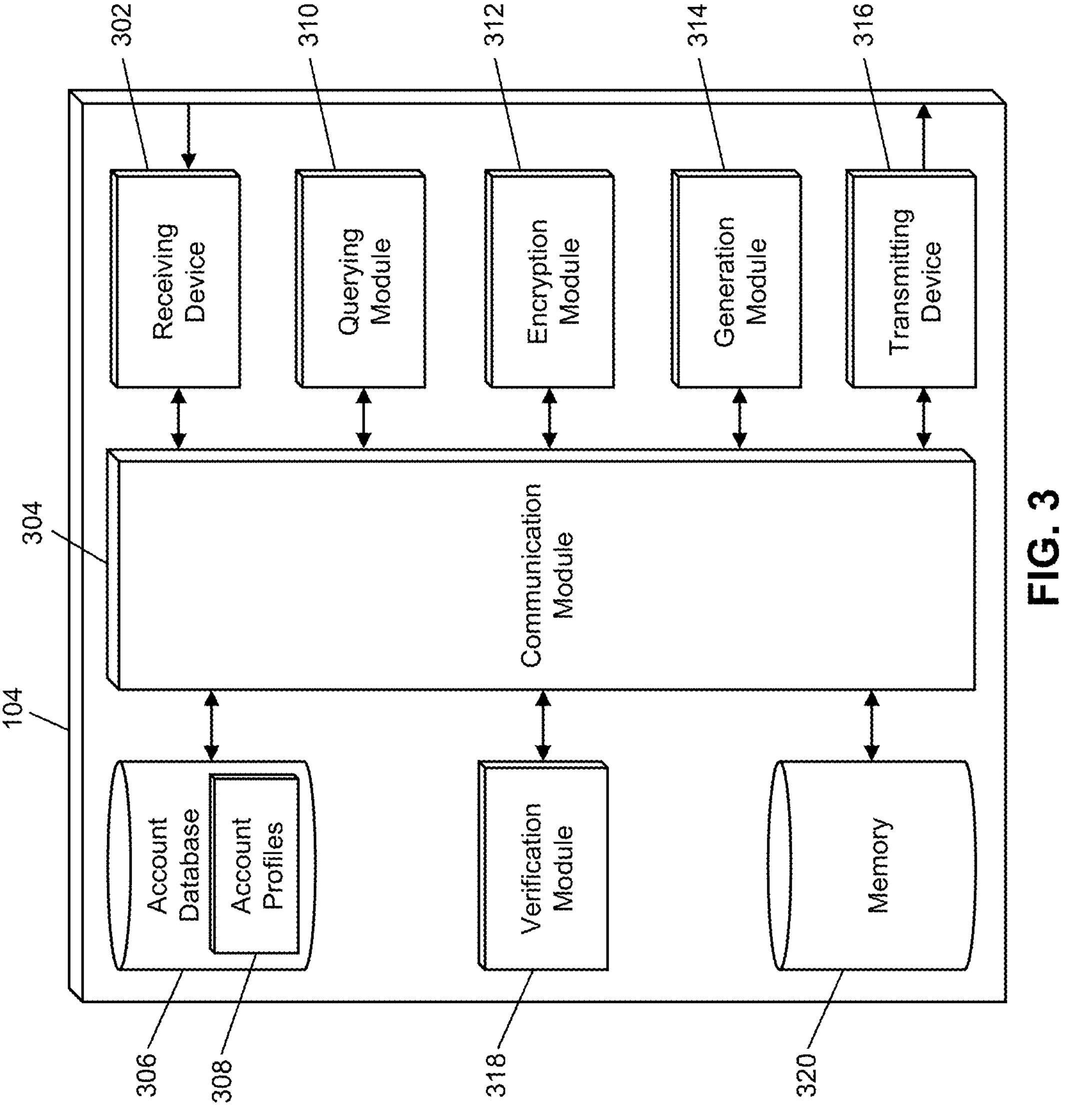
FIG. 3 is a block diagram illustrating the processing server of FIG. 1 for the generation and provisioning of session keys to computing devices in accordance with exemplary embodiments.

FIG. 3 illustrates an embodiment of a processing server 104 in the system 100. It will be apparent to persons having skill in the relevant art that the embodiment of the processing server 104 illustrated in FIG. 3 is provided as illustration only and may not be exhaustive to all possible configurations of the processing server 104 suitable for performing the functions as discussed herein. For example, the computer system 900 illustrated in FIG. 9 and discussed in more detail below may be a suitable configuration of the processing server 104.

The processing server 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 112 for the transmission of transaction messages that include sensitive financial data and information. In some instances, the receiving device 302 may also be configured to receive data from computing devices 102, issuing institutions 106, merchants 110, payment networks 112, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by payment networks 112 via payment rails associated therewith that may be superimposed or otherwise encoded with transaction messages. Transaction messages may be formatted pursuant to one or more standards, such as the ISO 8583 or 20022 standards, and include a message type indicator and a plurality of data elements, such as data elements configured to store application cryptograms and other payment credentials related to a transaction account used to fund the payment transaction. The receiving device 302 may also be configured to receive data signals electronically transmitted by issuing institutions 106 that may be superimposed or otherwise encoded with transaction messages, such as authorization responses for payment transactions that indicate approval or denial of the payment transaction, as well as transaction account data used in the registration of transaction accounts with computing devices 102, such as payment credential data. The receiving device 302 may also be configured to receive data signals electronically transmitted by the computing device 102, which may be superimposed or otherwise encoded with single use keys in requests for session keys, as well as requests for single use keys. The receiving device 302 may also receive data signals electronically transmitted by computing devices 102 that are superimposed or otherwise encoded with other data that may be used in the registration and management of a transaction account for performing the functions discussed herein.

The processing server 104 may also include a communication module 304. The communication module 304 may be configured to transmit data between modules, engines, databases, memories, and other components of the processing server 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the processing server 104 and external components of the processing server 104, such as externally connected databases, display devices, input devices, etc. The processing server 104 may also include a processing device. The processing device may be configured to perform the functions of the processing server 104 discussed herein as will be apparent to persons having skill in the relevant art. In some embodiments, the processing device may include and/or be comprised of a plurality of engines and/or modules specially configured to perform one or more functions of the processing device, such as a querying module 310, encryption module 312, generation module 314, verification module 318, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 104 may include an account database 306. The account database 306 may be configured to store a plurality of account profiles 308 using a suitable data storage format and schema. The account database 306 may be a relational database that utilizes structured query language for the storage, identification, modifying, updating, accessing, etc. of structured data sets stored therein. Each account profile 308 may be a structured data set configured to store data related to a transaction account. The account profile 308 may include at least an account identifier and an account identification number (AIN). The account identifier may be a unique value associated with the account profile 308 and/or related transaction account used in the identification thereof, such as may accompany data signals electronically transmitted from the computing device 102. In some instances, the account identifier may be a primary account number. In other instances, an account profile 308 may store the primary account number corresponding to the related transaction account in addition to the account identifier. In some embodiments, the account identifier may be a device identifier associated with the computing device 102 registered with the related transaction account, such as a media access control address or other device identification value. In some cases, an account profile 308 may have multiple account identifiers, such as in instances where multiple computing devices 102 may be registered for a transaction account.

The AIN may be an identification number that is equivalent to, and/or used in place of, a personal identification number (PIN) for use in the generation of application cryptograms. In some embodiments, an account profile 308 may also include single use keys or data associated therewith for management of single use keys and other data provisioned to a related computing device 102. Account profiles 308 may also be configured to store session keys generated for the related transaction account and provisioned to a related computing device 102, for use in the generation of application cryptograms for validation.

The processing server 104 may include a querying module 310. The querying module 310 may be configured to execute queries on databases to identify information. The querying module 310 may receive one or more data values or query strings, and may execute a query string based thereon on an indicated database, such as the account database 306, to identify information stored therein. The querying module 310 may then output the identified information to an appropriate engine or module of the processing server 104 as necessary. The querying module 310 may, for example, execute a query on the account database 306 to identify an account profile 308 related to a received single use key based on an account identifier in accompaniment therewith The processing server 104 may also include an encryption module 312. The encryption module 312 may be configured to encrypt and decrypt data via the use of encryption keys and associated algorithms. The encryption module 312 may receive data for encryption or decryption, may perform the appropriate task, and may output the subsequently encrypted or decrypted data to another module or engine of the processing server 104. In some instances, the encryption keys and/or algorithms to be used by the encryption module 312 may be provided with the data. In other instances, the encryption module 312 may identify (e.g., via queries executed by the querying module 310 on the appropriate memory) the encryption keys and/or algorithms for use. The encryption module 312 may, for example, be configured to encrypt session keys generated by the processing server 104 using server encryption keys for provisioning to computing devices 102 and used in the generation of application cryptograms.

The processing server 104 may also include a generation module 314. The generation module 314 may be configured to generate data for use in performing the functions of the processing server 104 as discussed herein. The generation module 314 may receive an instruction for data to be generated, may generate the requested data, and may output the data to another module or engine of the computing device 102. In some instances, the generation module 314 may also receive data for use in the generation of the requested data, or may identify (e.g., via queries executed by the querying module 310 on the appropriate memory) data for use therein. The generation module 314 may be configured to generate session keys using single use keys received for a transaction account and an AIN associated with the related transaction account, as may be included in a corresponding account profile 308. The generation module 314 may also be configured to generate application cryptograms for use in validating application cryptograms included in received transaction messages, such as may be generated using session keys generated thereby. The generation module 314 may also be configured to generate data messages for electronic transmission to the computing device 102, such as may include single use keys, encrypted session keys and server encryption keys, and data requests used in performing the functions discussed herein.

The processing server 104 may also include a verification module 318. The verification module 318 may be configured to receive data as input, may verify the data, and may output a result of the verification to another module or engine of the processing server 104. For example, the verification module 318 may be configured to verify integrity of the processing server 104 and/or of specific modules, engines, or memories included therein. For instance, the verification module 318 may be requested to verify or otherwise validate an application cryptogram included in a received transaction message. The verification module 318 may validate the application cryptogram by comparing it to another application cryptogram generated by the generation module 314 using the same session key that was generated to the computing device 102 from which the initial application cryptogram originated. The session key for use in the validation may be identified via a primary account number included in the transaction message (e.g., associated with the transaction account to which the session key corresponds) or other data included in the transaction message that may be associated with the computing device 102 to which the session key was provisioned, such as a device identifier.

The processing server 104 may also include a transmitting device 316. The transmitting device 316 may be configured to transmit data over one or more networks via one or more network protocols. In some embodiments, the transmitting device 316 may be configured to transmit data over the payment rails, such as using specially configured infrastructure associated with payment networks 112 for the transmission of transaction messages that include sensitive financial data and information, such as identified payment credentials. In some instances, the transmitting device 316 may be configured to transmit data to computing devices 102, issuing institutions 106, merchants 110, payment networks 112, and other entities via alternative networks, such as the Internet. In some embodiments, the transmitting device 316 may be comprised of multiple devices, such as different transmitting devices for transmitting data over different networks, such as a first transmitting device for transmitting data over the payment rails and a second transmitting device for transmitting data over the Internet. The transmitting device 316 may electronically transmit data signals that have data superimposed that may be parsed by a receiving computing device. In some instances, the transmitting device 316 may include one or more modules for superimposing, encoding, or otherwise formatting data into data signals suitable for transmission.

The transmitting device 316 may be configured to electronically transmit data signals to computing devices 102 that may be superimposed or otherwise encoded with single use keys, encrypted session keys and server encryption keys, payment credentials, and other data that may be used in the registration and management of a transaction account for performing the functions discussed herein. The transmitting device 316 may also be configured to electronically transmit data signals superimposed or otherwise encoded with validation results to issuing institutions 106 and payment networks 112. In some instances, validation results may be included in a transaction message, which may be electronically transmitted by the transmitting device 316 to the issuing institution 106 or payment network 112, which may be transmitted using payment rails associated with the payment network 112 or other suitable communication network.

The processing server 104 may also include a memory 320. The memory 320 may be configured to store data for use by the processing server 104 in performing the functions discussed herein. The memory 320 may be configured to store data using suitable data formatting methods and schema and may be any suitable type of memory, such as read-only memory, random access memory, etc. The memory 320 may include, for example, encryption keys and algorithms (e.g., server encryption keys), communication protocols and standards, data formatting standards and protocols, program code for modules and application programs of the processing device, and other data that may be suitable for use by the processing server 104 in the performance of the functions disclosed herein as will be apparent to persons having skill in the relevant art. In some embodiments, the memory 320 may be comprised of or may otherwise include a relational database that utilizes structured query language for the storage, identification, modifying, updating, accessing, etc. of structured data sets stored therein.

Process for Provisioning of Session Keys to Computing Devices

Figure 4:
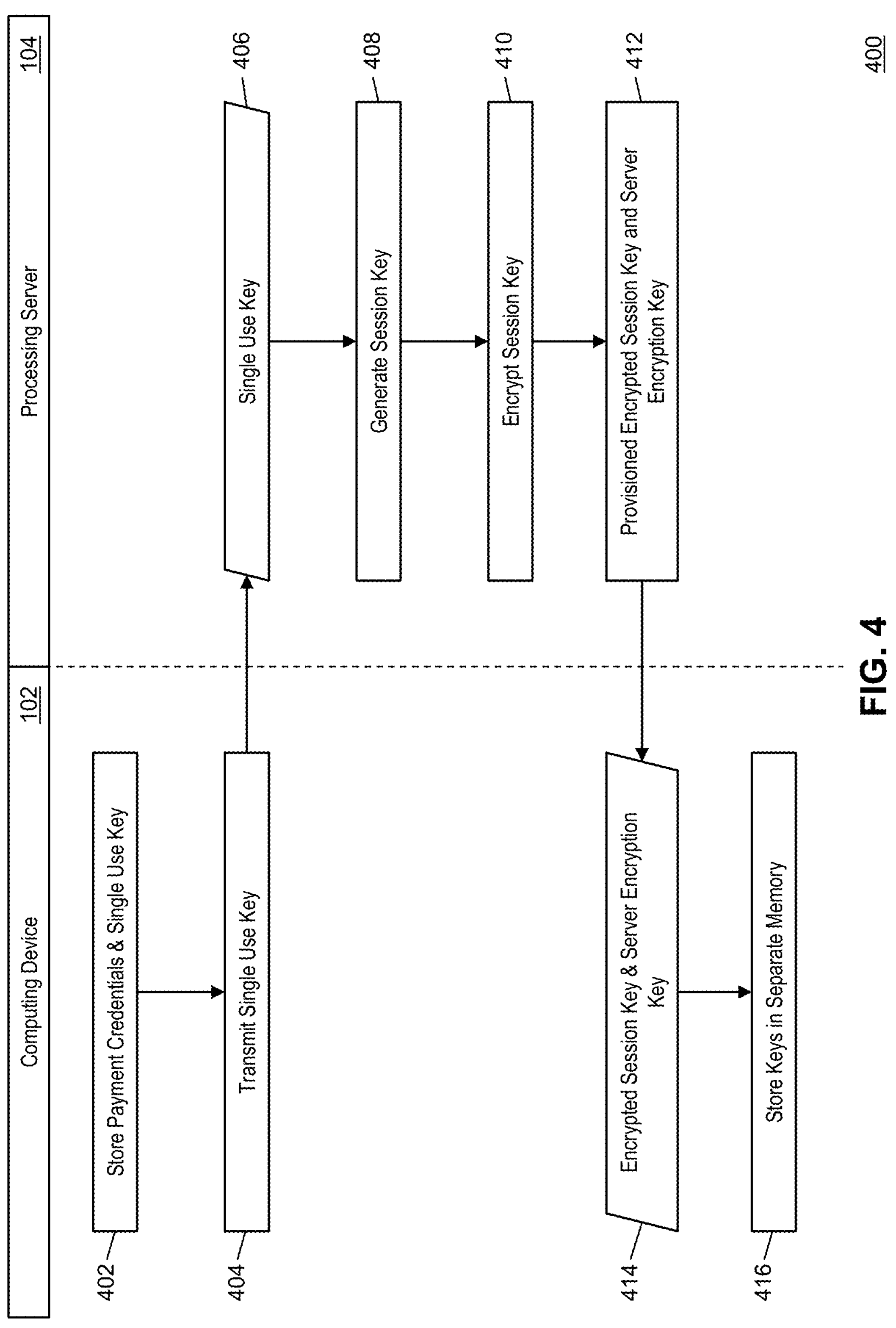
FIG. 4 is a flow diagram illustrating a process for the generation and provisioning of a session key to a computing device without the use of user authentication in accordance with exemplary embodiments.

FIG. 4 illustrates a process 400 for the provisioning of an encrypted session key and a server encryption key for decryption thereof to the computing device 102 for use in generation an application cryptogram for use in a payment transaction.

In step 402, the computing device 102 may store (e.g., via execution of queries by the querying module 210) payment credentials and at least one single use key related to a registered transaction account in the first memory 206 of the computing device 102. In step 404, the transmitting device 216 of the computing device 102 may (e.g., in response to an instruction received via the input device 220 of the computing device 102) electronically transmit a data signal to the processing server 104 that is superimposed or otherwise encoded with a single use key in a request for a session key. In step 406, the receiving device 302 of the processing server 104 may receive and parse the data signal. In some instances, the data signal may also include an account identifier associated with the registered transaction account and/or the computing device 102, which may be used by the querying module 310 of the processing server 104 in a query to identify the account profile 308 related to the registered transaction account.

In step 408, the generation module 314 of the processing server 104 may generate a session key. The session key may be generated using the received single use key and the AIN included in the related account profile 308. In step 410, the encryption module 312 of the processing server 104 may encrypt the session key using a server encryption key (e.g., queried from the memory 320 by the querying module 310) and one or more associated algorithms. In step 412, the transmitting device 316 of the processing server 104 may electronically transmit a data signal to the computing device 102 that is superimposed or otherwise encoded with the encrypted session key and server encryption key used in the encryption thereof.

In step 414, the receiving device 202 of the computing device 102 may receive the data signal and parse the encrypted session key and server encryption key therefrom. In step 416, the querying module 210 of the computing device 102 may execute queries for the storage of the encryption session key and server encryption key therein. The querying module 210 may execute a first query on the first memory 206 for storage of the encrypted session key therein, and may execute a second query on the second memory 208 for storage of the server encryption key therein.

In instances when a single computing device 102 may be used for multiple transaction accounts, the encrypted session key may be stored in a profile, portion, or memory that is associated with the transaction account related to the single use key provided to the processing server 104.

Process for Generation of an Application Cryptogram

Figure 5:
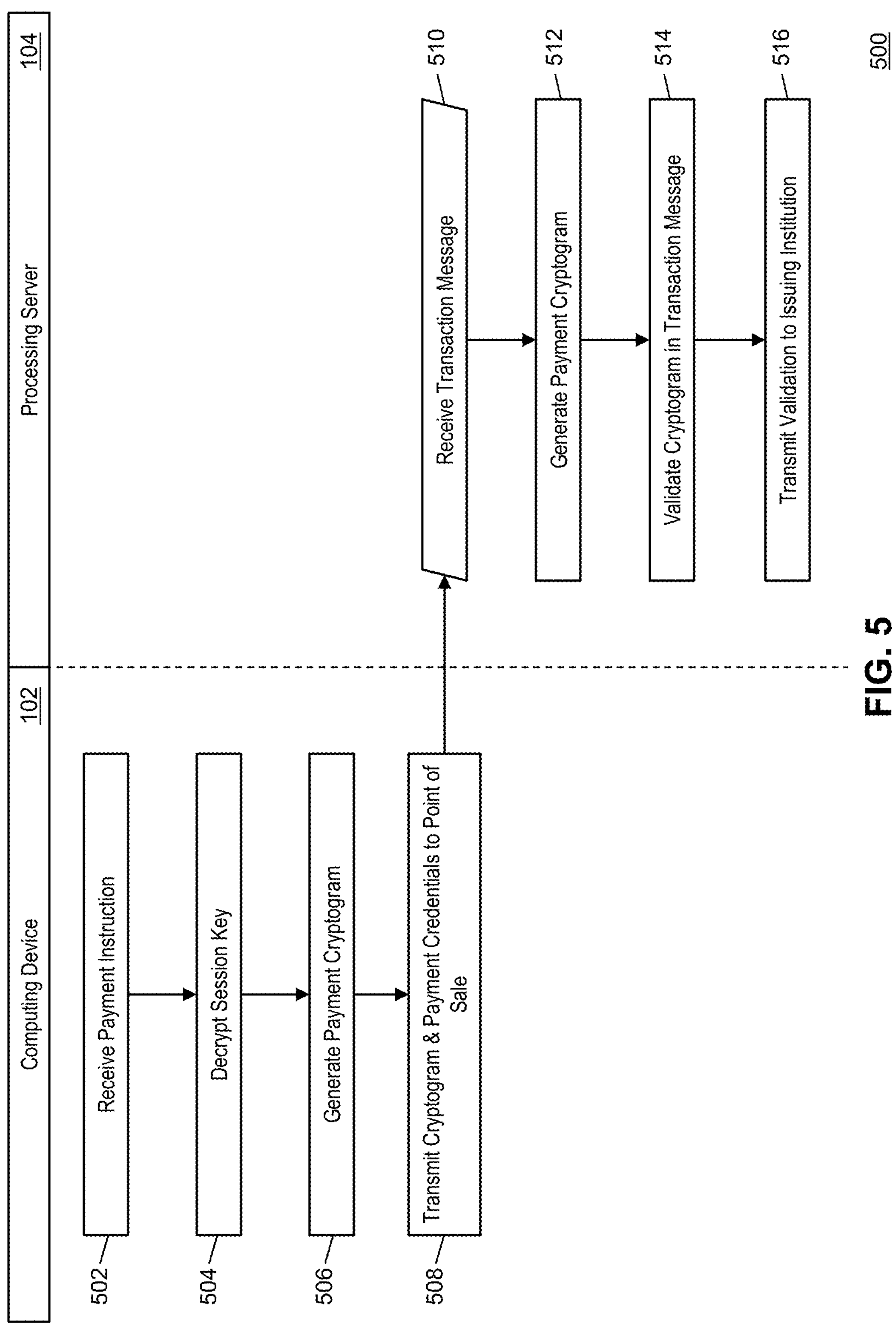
FIG. 5 is a flow diagram illustrating a process for the generation of an application cryptogram by a computing device without the use of user authentication in accordance with exemplary embodiments.

FIG. 5 illustrates a process for the generation of an application cryptogram using an encrypted session key provisioned to the computing device 102 for inclusion in payment credentials conveyed for use in a payment transaction.

In step 502, the input device 220 of the computing device 102 may receive an instruction to generate payment credentials for conveyance to a merchant 110 for a payment transaction. In instances where the computing device 102 may be used for multiple transaction accounts, the instruction may include data indicating which transaction account is to be used. In cases where the computing device 102 may not currently store an encrypted session key for the indicated transaction account, the computing device 102 may initiate the process illustrated in FIG. 4 and discussed above for the provisioning of an encrypted session key thereto.

In step 504, the encryption module 212 of the computing device 102 may decrypt the encrypted session key associated with the indicated transaction account. The encrypted session key may be read from the first memory 206 via the execution of a first query by the querying module 210 of the computing device 102, and may be decrypted via a server encryption key read from the second memory 208 via the execution of a second query by the querying module 210. In step 506, the generation module 214 of the computing device 102 may generate an application cryptogram using the decrypted session key. In some cases, step 506 may include the generation of additional cryptograms or other data that may comprise payment credentials for the indicated transaction account.

In step 508, the transmitting device 216 of the computing device 102 may convey (e.g., via electronic transmission, display of a machine-readable code, etc.) the application cryptogram and any other payment credentials associated with the indicated transaction account to a point of sale system associated with a merchant 110 involved in the payment transaction being initiated. The payment credentials, including the application cryptogram, may be included in a transaction message that is electronically transmitted to the payment network 112 by the merchant 110 or a related entity, which may be forwarded on to the processing server 104. In step 510, the receiving device 302 of the processing server 104 may receive the transaction message. The transaction message may be formatted pursuant to one or more standards, such as the ISO 8583 or 20022 standards, and may include at least one data element configured to store the application cryptogram.

In step 512, the generation module 314 of the processing server 104 may generate a second application cryptogram using a session key associated with the transaction account involved in the payment transaction. The session key may be identified via execution of a query (e.g., via the querying module 310 of the processing server 104) on the account database 306 of the processing server 104 to identify an account profile 308 related to the involved transaction account, which may be identified via an account identifier, primary account number, or other data stored in a data element included in the transaction message. In step 514, the verification module 318 of the processing server 104 may validate the application cryptogram included in the transaction message by comparing it to the second application cryptogram to validate that it was generated using the same session key. In step 516, the transmitting device 316 of the processing server 104 may electronically transmit a data signal superimposed with a result of the validation to the issuing institution 106 associated with the transaction account. In some instances, the validation result may be stored in a data element included in the transaction message, which may be transmitted to the issuing institution 106.

Exemplary Method for Generation of an Application Cryptogram

Figure 6:
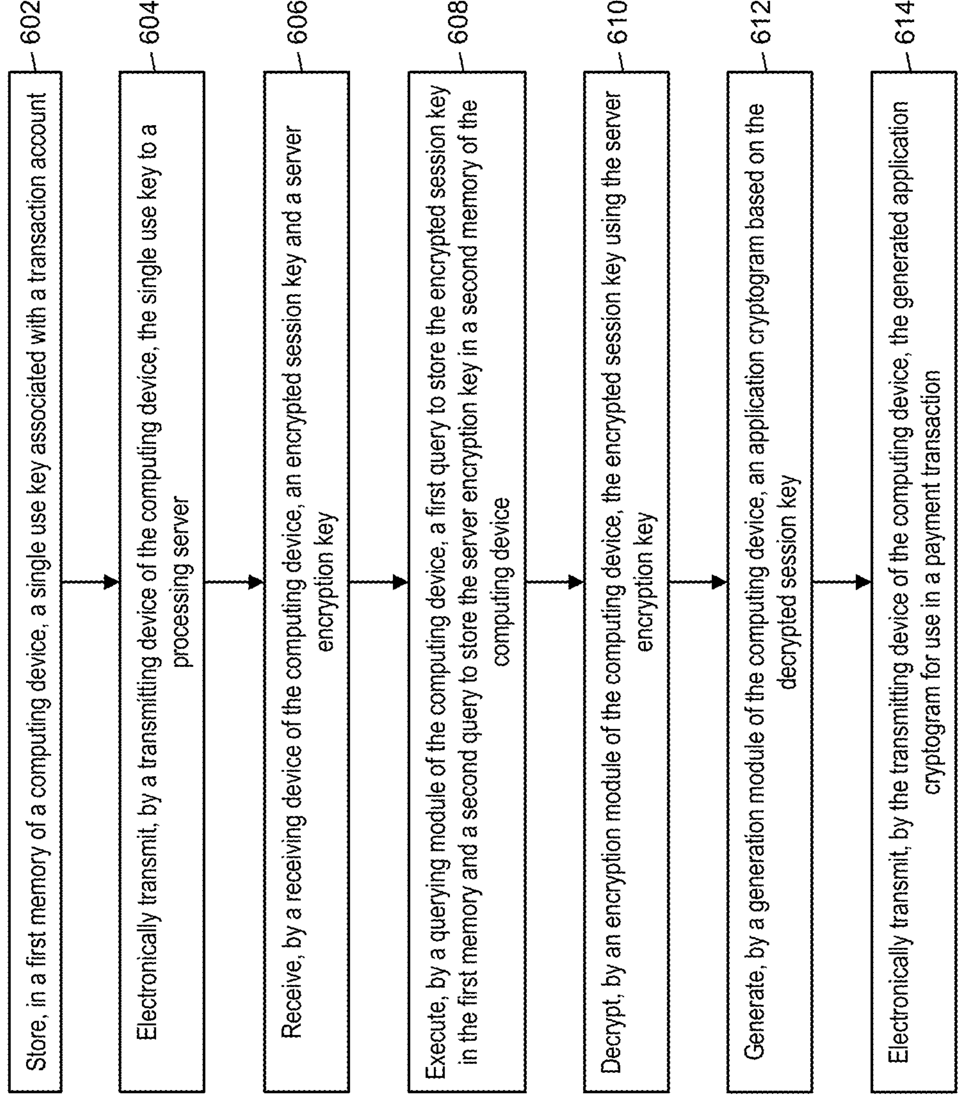
FIG. 6 is a flow chart illustrating an exemplary method for generation of an application cryptogram for use in a payment transaction in accordance with exemplary embodiments.

FIG. 6 illustrates a method 600 for the generation of an application cryptogram for use in a payment transaction using an encrypted session key generated via a provided single use key.

In step 602, a single use key associated with a transaction account may be stored in a first memory (e.g., the first memory 206) of a computing device (e.g., the computing device 102). In step 604, the single use key may be electronically transmitted by a transmitting device (e.g., the transmitting device 216) of the computing device to a processing server (e.g., the processing server 104).

In step 606, an encrypted session key and a server encryption key may be received by a receiving device (e.g., the receiving device 202) of the computing device from the processing server. In step 608, a first query may be executed by a querying module (e.g., the querying module 210) of the computing device to store the encrypted session key in the first memory, and a second query may be executed by the querying module to store the server encryption key in a second memory (e.g., the second memory 208) of the computing device.

In step 610, the encrypted session key may be decrypted by an encryption module (e.g., the encryption module 212) of the computing device using the server encryption key. In step 612, an application cryptogram may be generated by a generation module (e.g., the generation module 214) of the computing device based on the decrypted session key. In step 614, the generation application cryptogram may be electronically transmitted by the transmitting device of the computing device for use in a payment transaction.

In one embodiment, the method 600 may further include receiving, by an input module (e.g., the input device 220) of the computing device, an instruction to initiate a payment transaction prior to decrypting the encrypted session key. In some embodiments, the method 600 may also include verifying, by a verification module (e.g., the verification module 218) of the computing device, device integrity of the computing device prior to at least receiving the encrypted session key and server encryption key. In one embodiment, the second memory may further include payment credentials, and the payment credentials may be electronically transmitted for use in a payment transaction with the generated application cryptogram. In some embodiments, the second memory may be random access memory.

Exemplary Method for Provisioning a Session Key

Figure 7:
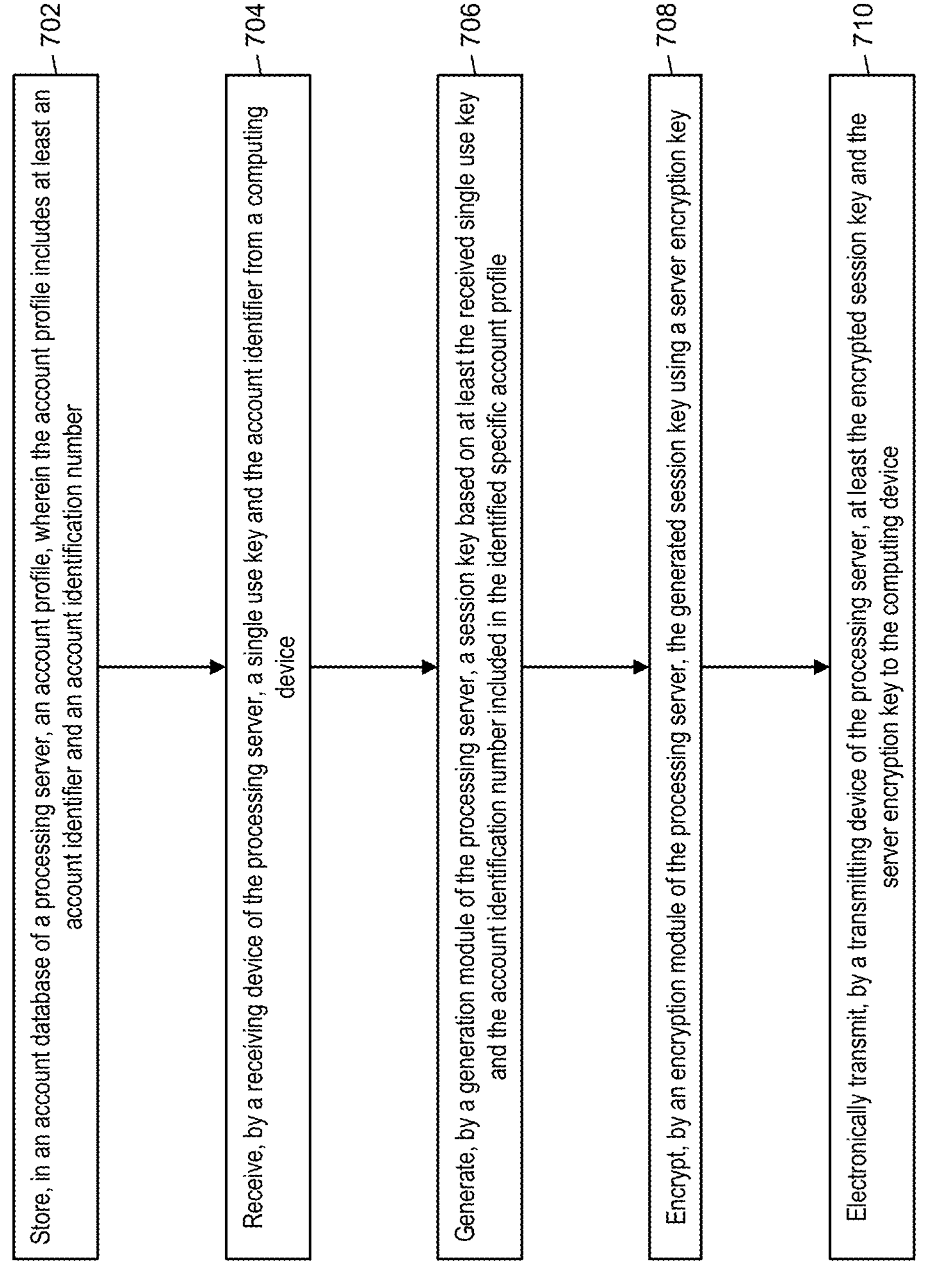
FIG. 7 is a flow chart illustrating an exemplary method for provisioning a session key for use in generating an application cryptogram for use in a payment transaction in accordance with exemplary embodiments.

FIG. 7 illustrates a method 700 for the provisioning of an encrypted session key to a computing device for decryption and use thereof in generating an application cryptogram for use in a payment transaction.

In step 702, an account profile (e.g., account profile 308) may be stored in an account database (e.g., the account database 306) of a processing server (e.g., the processing server 104), wherein the account profile includes at least an account identifier and an account identification number. In step 704, a single use key and the account identifier may be received by a receiving device (e.g., the receiving device 302) of the processing server from a computing device (e.g., the computing device 102).

In step 706, a session key may be generated by a generation module (e.g., the generation module 314) of the processing server based on at least the received single use key and the account identification number included in the account profile. In step 708, the generated session key may be encrypted by an encryption module (e.g., the encryption module 312) of the processing server using a server encryption key. In step 710, at least the encrypted session key and the server encryption key may be electronically transmitted by a transmitting device (e.g., the transmitting device 316) of the processing server to the computing device.

In one embodiment, the method 700 may further include receiving, by the receiving device of the processing server, a transaction message related to a payment transaction, wherein the transaction message includes at least a first application cryptogram; generating, by the generation module of the processing server, a second application cryptogram based on the generated session key; and verifying, by a verification module (e.g., the verification module 318) of the processing server, equivalence of the first application cryptogram and the second application cryptogram. In a further embodiment, the method 700 may even further include electronically transmitting, by the transmitting device of the processing server, a result of the verification to a financial institution associated with the transaction account for use in authorization of the related payment transaction.

In some embodiments, the method 700 may also include receiving, by the receiving device of the processing server, an integrity check value from the computing device; and verifying, by a verification module (e.g., the verification module 318) of the processing server, device integrity of the computing device based on the received integrity check value. In a further embodiment, verification of the device integrity may be performed prior to transmission of the encrypted session key and server encryption key to the computing device.

Payment Transaction Processing System and Process

Figure 8:
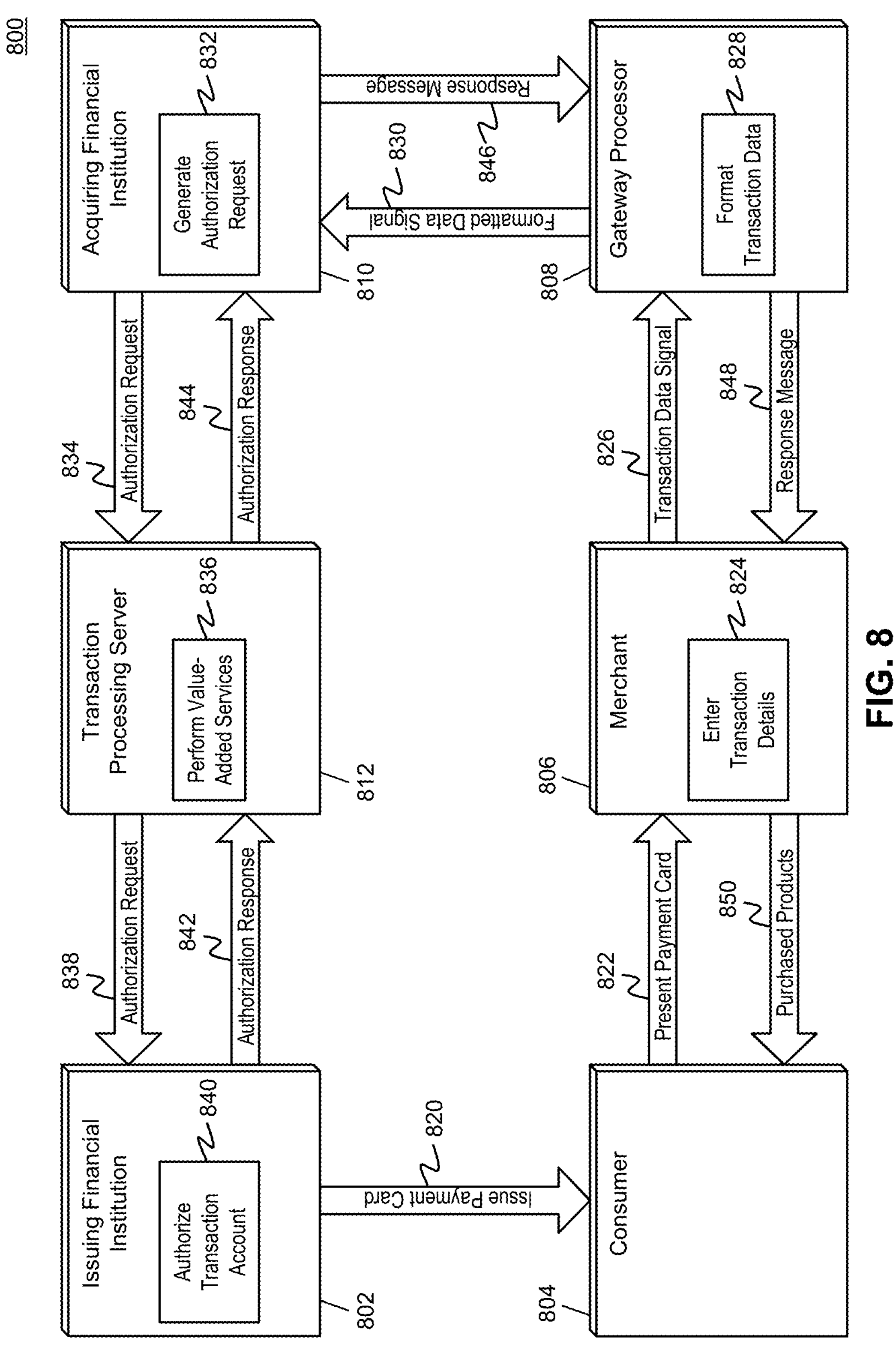
FIG. 8 is a flow diagram illustrating the processing of a payment transaction in accordance with exemplary embodiments.

FIG. 8 illustrates a transaction processing system and a process 800 for the processing of payment transactions in the system, which may include the processing of thousands, millions, or even billions of transactions during a given period (e.g., hourly, daily, weekly, etc.). The process 800 and steps included therein may be performed by one or more components of the system 100 discussed above, such as the computing device 102, processing server 104, issuing institution 106, merchant 110, payment network 112, etc. The processing of payment transactions using the system and process 800 illustrated in FIG. 8 and discussed below may utilize the payment rails, which may be comprised of the computing devices and infrastructure utilized to perform the steps of the process 800 as specially configured and programmed by the entities discussed below, including the transaction processing server 812, which may be associated with one or more payment networks configured to processing payment transactions. It will be apparent to persons having skill in the relevant art that the process 800 may be incorporated into the processes illustrated in FIGS. 4-7, discussed above, with respect to the step or steps involved in the processing of a payment transaction. In addition, the entities discussed herein for performing the process 800 may include one or more computing devices or systems configured to perform the functions discussed below. For instance, the merchant 806 may be comprised of one or more point of sale devices, a local communication network, a computing server, and other devices configured to perform the functions discussed below.

In step 820, an issuing financial institution 802 may issue a payment card or other suitable payment instrument to a consumer 804. The issuing financial institution may be a financial institution, such as a bank, or other suitable type of entity that administers and manages payment accounts and/or payment instruments for use with payment accounts that can be used to fund payment transactions. The consumer 804 may have a transaction account with the issuing financial institution 802 for which the issued payment card is associated, such that, when used in a payment transaction, the payment transaction is funded by the associated transaction account. In some embodiments, the payment card may be issued to the consumer 804 physically. In other embodiments, the payment card may be a virtual payment card or otherwise provisioned to the consumer 804 in an electronic format.

In step 822, the consumer 804 may present the issued payment card to a merchant 806 for use in funding a payment transaction. The merchant 806 may be a business, another consumer, or any entity that may engage in a payment transaction with the consumer 804. The payment card may be presented by the consumer 804 via providing the physical card to the merchant 806, electronically transmitting (e.g., via near field communication, wireless transmission, or other suitable electronic transmission type and protocol) payment details for the payment card, or initiating transmission of payment details to the merchant 806 via a third party. The merchant 806 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 824, the merchant 806 may enter transaction details into a point of sale computing system. The transaction details may include the payment details provided by the consumer 804 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 806 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 806 may be an online retailer in an e-commerce transaction. In such embodiments, the transaction details may be entered in a shopping cart or other repository for storing transaction data in an electronic transaction as will be apparent to persons having skill in the relevant art.

In step 826, the merchant 806 may electronically transmit a data signal superimposed with transaction data to a gateway processor 808. The gateway processor 808 may be an entity configured to receive transaction details from a merchant 806 for formatting and transmission to an acquiring financial institution 810. In some instances, a gateway processor 808 may be associated with a plurality of merchants 806 and a plurality of acquiring financial institutions 810. In such instances, the gateway processor 808 may receive transaction details for a plurality of different transactions involving various merchants, which may be forwarded on to appropriate acquiring financial institutions 810. By having relationships with multiple acquiring financial institutions 810 and having the requisite infrastructure to communicate with financial institutions using the payment rails, such as using application programming interfaces associated with the gateway processor 808 or financial institutions used for the submission, receipt, and retrieval of data, a gateway processor 808 may act as an intermediary for a merchant 806 to be able to conduct payment transactions via a single communication channel and format with the gateway processor 808, without having to maintain relationships with multiple acquiring financial institutions 810 and payment processors and the hardware associated thereto. Acquiring financial institutions 810 may be financial institutions, such as banks, or other entities that administers and manages payment accounts and/or payment instruments for use with payment accounts. In some instances, acquiring financial institutions 810 may manage transaction accounts for merchants 806. In some cases, a single financial institution may operate as both an issuing financial institution 802 and an acquiring financial institution 810.

The data signal transmitted from the merchant 806 to the gateway processor 808 may be superimposed with the transaction details for the payment transaction, which may be formatted based on one or more standards. In some embodiments, the standards may be set forth by the gateway processor 808, which may use a unique, proprietary format for the transmission of transaction data to/from the gateway processor 808. In other embodiments, a public standard may be used, such as the International Organization for Standardization's ISO 8883 standard. The standard may indicate the types of data that may be included, the formatting of the data, how the data is to be stored and transmitted, and other criteria for the transmission of the transaction data to the gateway processor 808.

In step 828, the gateway processor 808 may parse the transaction data signal to obtain the transaction data superimposed thereon and may format the transaction data as necessary. The formatting of the transaction data may be performed by the gateway processor 808 based on the proprietary standards of the gateway processor 808 or an acquiring financial institution 810 associated with the payment transaction. The proprietary standards may specify the type of data included in the transaction data and the format for storage and transmission of the data. The acquiring financial institution 810 may be identified by the gateway processor 808 using the transaction data, such as by parsing the transaction data (e.g., deconstructing into data elements) to obtain an account identifier included therein associated with the acquiring financial institution 810. In some instances, the gateway processor 808 may then format the transaction data based on the identified acquiring financial institution 810, such as to comply with standards of formatting specified by the acquiring financial institution 810. In some embodiments, the identified acquiring financial institution 810 may be associated with the merchant 806 involved in the payment transaction, and, in some cases, may manage a transaction account associated with the merchant 806.

In step 830, the gateway processor 808 may electronically transmit a data signal superimposed with the formatted transaction data to the identified acquiring financial institution 810. The acquiring financial institution 810 may receive the data signal and parse the signal to obtain the formatted transaction data superimposed thereon. In step 832, the acquiring financial institution may generate an authorization request for the payment transaction based on the formatted transaction data. The authorization request may be a specially formatted transaction message that is formatted pursuant to one or more standards, such as the ISO 8883 standard and standards set forth by a payment processor used to process the payment transaction, such as a payment network. The authorization request may be a transaction message that includes a message type indicator indicative of an authorization request, which may indicate that the merchant 806 involved in the payment transaction is requesting payment or a promise of payment from the issuing financial institution 802 for the transaction. The authorization request may include a plurality of data elements, each data element being configured to store data as set forth in the associated standards, such as for storing an account number, application cryptogram, transaction amount, issuing financial institution 802 information, etc.

In step 834, the acquiring financial institution 810 may electronically transmit the authorization request to a transaction processing server 812 for processing. The transaction processing server 812 may be comprised of one or more computing devices as part of a payment network configured to process payment transactions. In some embodiments, the authorization request may be transmitted by a transaction processor at the acquiring financial institution 810 or other entity associated with the acquiring financial institution. The transaction processor may be one or more computing devices that include a plurality of communication channels for communication with the transaction processing server 812 for the transmission of transaction messages and other data to and from the transaction processing server 812. In some embodiments, the payment network associated with the transaction processing server 812 may own or operate each transaction processor such that the payment network may maintain control over the communication of transaction messages to and from the transaction processing server 812 for network and informational security.

In step 836, the transaction processing server 812 may perform value-added services for the payment transaction. Value-added services may be services specified by the issuing financial institution 802 that may provide additional value to the issuing financial institution 802 or the consumer 804 in the processing of payment transactions. Value-added services may include, for example, fraud scoring, transaction or account controls, account number mapping, offer redemption, loyalty processing, etc. For instance, when the transaction processing server 812 receives the transaction, a fraud score for the transaction may be calculated based on the data included therein and one or more fraud scoring algorithms and/or engines. In some instances, the transaction processing server 812 may first identify the issuing financial institution 802 associated with the transaction, and then identify any services indicated by the issuing financial institution 802 to be performed. The issuing financial institution 802 may be identified, for example, by data included in a specific data element included in the authorization request, such as an issuer identification number. In another example, the issuing financial institution 802 may be identified by the primary account number stored in the authorization request, such as by using a portion of the primary account number (e.g., a bank identification number) for identification.

In step 838, the transaction processing server 812 may electronically transmit the authorization request to the issuing financial institution 802. In some instances, the authorization request may be modified, or additional data included in or transmitted accompanying the authorization request as a result of the performance of value-added services by the transaction processing server 812. In some embodiments, the authorization request may be transmitted to a transaction processor (e.g., owned or operated by the transaction processing server 812) situated at the issuing financial institution 802 or an entity associated thereof, which may forward the authorization request to the issuing financial institution 802.

In step 840, the issuing financial institution 802 may authorize the transaction account for payment of the payment transaction. The authorization may be based on an available credit amount for the transaction account and the transaction amount for the payment transaction, fraud scores provided by the transaction processing server 812, and other considerations that will be apparent to persons having skill in the relevant art. The issuing financial institution 802 may modify the authorization request to include a response code indicating approval (e.g., or denial if the transaction is to be denied) of the payment transaction. The issuing financial institution 802 may also modify a message type indicator for the transaction message to indicate that the transaction message is changed to be an authorization response. In step 842, the issuing financial institution 802 may transmit (e.g., via a transaction processor) the authorization response to the transaction processing server 812.

In step 844, the transaction processing server 812 may forward the authorization response to the acquiring financial institution 810 (e.g., via a transaction processor). In step 846, the acquiring financial institution may generate a response message indicating approval or denial of the payment transaction as indicated in the response code of the authorization response, and may transmit the response message to the gateway processor 808 using the standards and protocols set forth by the gateway processor 808. In step 848, the gateway processor 808 may forward the response message to the merchant 806 using the appropriate standards and protocols. In step 850, assuming the transaction was approved, the merchant 806 may then provide the products purchased by the consumer 804 as part of the payment transaction to the consumer 804.

In some embodiments, once the process 800 has completed, payment from the issuing financial institution 802 to the acquiring financial institution 810 may be performed. In some instances, the payment may be made immediately or within one business day. In other instances, the payment may be made after a period of time, and in response to the submission of a clearing request from the acquiring financial institution 810 to the issuing financial institution 802 via the transaction processing server 802. In such instances, clearing requests for multiple payment transactions may be aggregated into a single clearing request, which may be used by the transaction processing server 812 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 840), the transaction processing server 812 may be configured to perform authorization of transactions on behalf of the issuing financial institution 802. Such actions may be referred to as "stand-in processing," where the transaction processing server "stands in" as the issuing financial institution 802. In such instances, the transaction processing server 812 may utilize rules set forth by the issuing financial institution 802 to determine approval or denial of the payment transaction, and may modify the transaction message accordingly prior to forwarding to the acquiring financial institution 810 in step 844. The transaction processing server 812 may retain data associated with transactions for which the transaction processing server 812 stands in, and may transmit the retained data to the issuing financial institution 802 once communication is reestablished. The issuing financial institution 802 may then process transaction accounts accordingly to accommodate for the time of lost communication.

In another example, if the transaction processing server 812 is unavailable for submission of the authorization request by the acquiring financial institution 810, then the transaction processor at the acquiring financial institution 810 may be configured to perform the processing of the transaction processing server 812 and the issuing financial institution 802. The transaction processor may include rules and data suitable for use in making a determination of approval or denial of the payment transaction based on the data included therein. For instance, the issuing financial institution 802 and/or transaction processing server 812 may set limits on transaction type, transaction amount, etc. that may be stored in the transaction processor and used to determine approval or denial of a payment transaction based thereon. In such instances, the acquiring financial institution 810 may receive an authorization response for the payment transaction even if the transaction processing server 812 is unavailable, ensuring that transactions are processed and no downtime is experienced even in instances where communication is unavailable. In such cases, the transaction processor may store transaction details for the payment transactions, which may be transmitted to the transaction processing server 812 (e.g., and from there to the associated issuing financial institutions 802) once communication is reestablished.

In some embodiments, transaction processors may be configured to include a plurality of different communication channels, which may utilize multiple communication cards and/or devices, to communicate with the transaction processing server 812 for the sending and receiving of transaction messages. For example, a transaction processor may be comprised of multiple computing devices, each having multiple communication ports that are connected to the transaction processing server 812. In such embodiments, the transaction processor may cycle through the communication channels when transmitting transaction messages to the transaction processing server 812, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 810 may identify that an authorization request involves an issuing financial institution 802 (e.g., via the bank identification number included in the transaction message) for which no value-added services are required. The transaction processor at the acquiring financial institution 810 may then transmit the authorization request directly to the transaction processor at the issuing financial institution 802 (e.g., without the authorization request passing through the transaction processing server 812), where the issuing financial institution 802 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 812 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 808, acquiring financial institution 810, etc.) for processing using this advanced network, and to quickly and efficiently receive a response regarding the ability for a consumer 804 to fund the payment transaction.

Computer System Architecture

Figure 9:
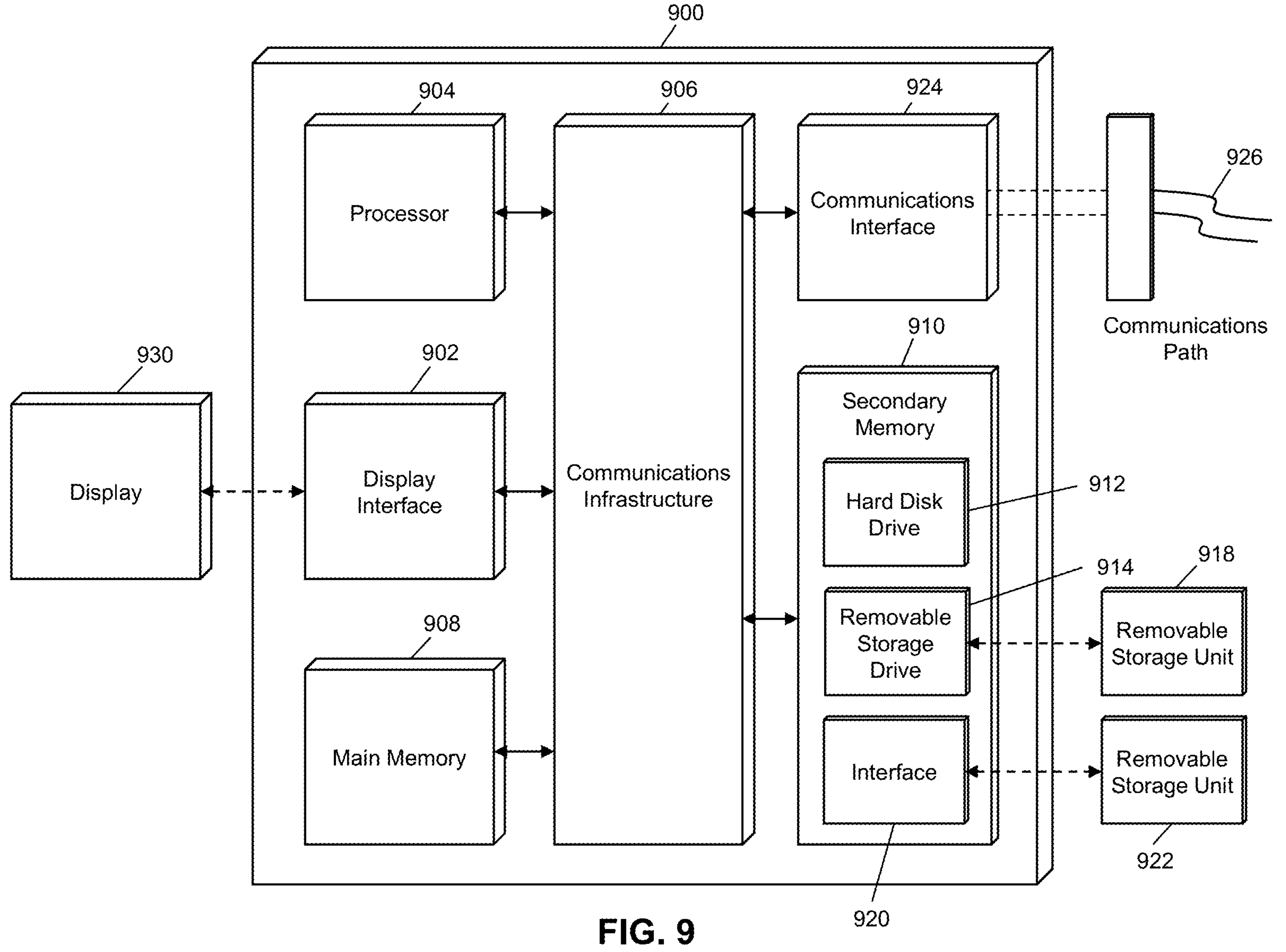
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the computing device 102 and processing server 104 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-8.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 4-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for the provisioning of encrypted session keys to computing devices and use thereof in the generation of application cryptograms for use in payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for provisioning of a session key, said method comprising:

receiving, by a processing server, from a computing device, a session key request including a single use key and an account identifier, wherein the single use key is a payment token that is associated with a transaction account;

generating, by the processing server, a session key based on the received single use key and an account identification number included in an account profile;

encrypting, by the processing server, the generated session key using a server encryption key;

transmitting, by the processing server, the encrypted session key and the server encryption key to the computing device; and generating, by the computing device, an application cryptogram without requiring input of a personal identification number (PIN).

2. The method of claim 1, further comprising:

receiving, by the processing server, a transaction message related to a payment transaction, wherein the transaction message includes at least a first application cryptogram;

generating, by the processing server, a second application cryptogram based on the generated session key; and verifying, by the processing server, equivalence of the first application cryptogram and the second application cryptogram.

3. The method of claim 2, further comprising:

transmitting, by the processing server, a result of the verification to a financial institution associated with the transaction account for use in authorization of the related payment transaction.

4. The method of claim 1, further comprising:

receiving, by the processing server, an integrity check value from the computing device; and verifying, by the processing server, device integrity of the computing device based on the received integrity check value.

5. The method of claim 4, wherein verification of the device integrity is performed prior to transmission of the encrypted session key and server encryption key to the computing device.

6. A system for provisioning of a session key, comprising:

a processing server; and a computing device, wherein the processing server includes a receiving device configured to receive a single use key and an account identifier from a computing device, wherein the single use key is a payment token that is associated with a transaction account, and a processing device configured to (i) generate a session key based on the received single use key and an account identification number included in an account profile, and (ii) encrypt the generated session key using a server encryption key, and a transmitting device configured to transmit the encrypted session key and the server encryption key to the computing device, and wherein the computing device is configured to generate an application cryptogram without requiring input of a personal identification number (PIN).

7. The system of claim 6, wherein the receiving device of the processing server is further configured to receive a transaction message related to a payment transaction, wherein the transaction message includes at least a first application cryptogram and the processing device of the processing server is further configured to generate a second application cryptogram based on the generated session key, and verify equivalence of the first application cryptogram and the second application cryptogram.

8. The system of claim 7, wherein the transmitting device of the processing server is further configured to transmit a result of the verification to a financial institution associated with the transaction account for use in authorization of the related payment transaction.

9. The system of claim 6, wherein the receiving device of the processing server is further configured to receive an integrity check value from the computing device, and the processing device of the processing server is configured to verify device integrity of the computing device based on the received integrity check value.

10. The system of claim 9, wherein verification of the device integrity is performed prior to transmission of the encrypted session key and server encryption key to the computing device.

* * * * *